(12) United States Patent
Barra Chicote et al.

(10) Patent No.: US 10,079,021 B1
(45) Date of Patent: Sep. 18, 2018

(54) LOW LATENCY AUDIO INTERFACE

(71) Applicant: Amazon Technologies, Inc., Seattle, WA (US)

(72) Inventors: Roberto Barra Chicote, Cambridge (GB); Adam Franciszek Nadolski, Gdansk (PL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/974,872

(22) Filed: Dec. 18, 2015

(51) Int. Cl.
  *G10L 15/22* (2006.01)
  *G10L 15/30* (2013.01)
  *G10L 13/04* (2013.01)
  *G10L 15/32* (2013.01)
  *G10L 13/027* (2013.01)
  *G10L 15/18* (2013.01)

(52) U.S. Cl.
  CPC ........... *G10L 15/30* (2013.01); *G10L 13/027* (2013.01); *G10L 13/04* (2013.01); *G10L 15/18* (2013.01); *G10L 15/32* (2013.01); *G10L 15/22* (2013.01)

(58) Field of Classification Search
  CPC ....... G10L 13/02; G10L 13/04; G10L 13/047; G10L 13/06; G10L 15/22
  USPC ...................... 704/260, 257, 270, 270.1, 275
  See application file for complete search history.

(56) References Cited

U.S. PATENT DOCUMENTS

| | | | | |
|---|---|---|---|---|
| 6,122,616 A * | 9/2000 | Henton | .................... | G10L 13/02 704/258 |
| 6,366,879 B1 * | 4/2002 | Coxhead | ............... | H04M 3/493 379/88.1 |
| 8,340,256 B2 * | 12/2012 | Jorgensen | ........... | H04L 65/4061 370/237 |
| 2003/0055641 A1 * | 3/2003 | Yi | ........................... | G10L 13/06 704/238 |
| 2004/0215460 A1 * | 10/2004 | Cosatto | ............. | G06F 17/30905 704/260 |
| 2007/0055527 A1 * | 3/2007 | Jeong | .................... | G10L 13/033 704/260 |
| 2008/0015860 A1 * | 1/2008 | Lane | .................... | G10L 13/047 704/258 |
| 2008/0319752 A1 * | 12/2008 | Kuo | ....................... | G10L 13/047 704/258 |
| 2011/0320951 A1 * | 12/2011 | Paillet | ..................... | H04L 67/02 715/734 |
| 2012/0036121 A1 * | 2/2012 | Jitkoff | ..................... | G06F 3/167 707/722 |
| 2012/0203557 A1 * | 8/2012 | Odinak | .............. | G01C 21/3608 704/270.1 |

(Continued)

*Primary Examiner* — James Wozniak
(74) *Attorney, Agent, or Firm* — Pierce Atwood LLP (57) ABSTRACT

Systems and methods for utilizing incremental processing of portions of output data to limit the time required to provide a response to a user request are provided herein. In some embodiments, portions of the user request for information can be analyzed using techniques such as automatic speech recognition (ASR), speech-to-text (STT), and natural language understanding (NLU) to determine the overall topic of the user request. One the topic has been determined, portions of the anticipated audio output data can be synthesized independently instead of waiting for the complete response. The synthesized portions can then be provided to the electronic device in anticipation of being output through one or more speakers on the electronic device, which speeds up the time that the response can be provided to the user.

13 Claims, 7 Drawing Sheets

(56) References Cited

U.S. PATENT DOCUMENTS

| | | | |
|---|---|---|---|
| 2013/0096921 A1* | 4/2013 | Kuwamoto | G08G 1/0962 704/260 |
| 2013/0144624 A1* | 6/2013 | Conkie | G10L 13/04 704/260 |
| 2013/0173519 A1* | 7/2013 | Antebi | G06N 5/022 706/46 |
| 2013/0289998 A1* | 10/2013 | Eller | G10L 13/08 704/260 |
| 2014/0088974 A1* | 3/2014 | Mittal | G10L 19/18 704/500 |
| 2014/0337370 A1* | 11/2014 | Aravamudan | G06F 17/30026 707/759 |
| 2014/0365216 A1* | 12/2014 | Gruber | G10L 13/027 704/235 |
| 2015/0134320 A1* | 5/2015 | Rangarajan Sridhar | G06F 17/2775 704/2 |
| 2016/0027440 A1* | 1/2016 | Gelfenbeyn | G10L 15/32 704/244 |
| 2016/0086597 A1* | 3/2016 | Matsubara | G10L 13/027 704/243 |
| 2016/0203002 A1* | 7/2016 | Kannan | G06F 9/4446 715/708 |

\* cited by examiner

LOW LATENCY AUDIO INTERFACE

BACKGROUND

Each passing day, more and more consumers utilize computing devices to find out information on a variety of subjects. Some of these computing devices are portable, such as smart phones and tablet computers, while others are intended to remain somewhat fixed in a given location, such as desktop computers, smart TVs, etc. In addition, an increasing numbers of consumers are utilizing internet access devices that communicate with consumers via voice commands, such as the Amazon Echo. When using an Echo, a user simply speaks a wakeword to start the process, such as "Alexa, what's the weather going to be this afternoon?" (where "Alexa" is the wakeword). The Echo can communicate with a backend system and output speech that says the local weather forecast for that afternoon.

DETAILED DESCRIPTION

The present disclosure, as set forth below, is generally directed to various embodiments of methods and devices related to using incremental information being received in connection with a request for content, to begin producing the output response prior to the request being complete. Devices like Amazon's Echo are increasingly useful to provide users with quick and easy access to remotely stored information. Current system architectures introduce temporal latencies between the user's request and the system's response. Through innovation, new technical solutions are provided herein that can be used to provide information in a faster manner to enhance the user experience. The system can take advantage of these temporal latencies to begin producing the output message before the user has completed making the request, or before the system has figured out exactly what the request is. For example, while a request for the score of a football game is being received, the system could determine that the request was about a sports score and generate part of the output response before the actual score has been determined. Once the specifics have been determined, such as the name of the team the user is interested in, the system can then generate the remaining portion of the output response which can be played for the user.

The preprocessing of a portion of the output response limits the time required to produce the output data that can be presented to the user through speakers, such that the user experience can be more akin to an interactive conversation with another person as opposed to a search query using a complex network-based system. The preprocessing can occur by applying automatic speech recognition (ASR) to the input data that represents the spoken request from the user. That request can start with, or include embedded within the request, a wakeword, such as "Alexa," "Amazon" or some other locally-stored data that is used for on-device keyword spotting. In response to identifying the wakeword locally, the electronic device begins sending audio data, which is associated with audio signals captured by its microphone(s) to the machines of the backend system for processing. The backend processing can include further ASR processing, natural language understanding (NLU) processing (the processes by which the backend system attempts to derive the meaning of the words in the audio data that was recorded by the electronic device, which can include parsing and disassembling of the ASR's output data). Once the backend system determines the type of information requested, such as the weather, stock quotes, sports scores, current movies playing nearby, etc., the backend system assigns the task of determining the response to one or more skills (e.g., an app or other type of instruction that interfaces with other systems and/or services to search for and retrieve information). These skills can be provided within the structure of the backend system and/or they can be services provided by third parties (e.g., using application program interfaces (APIs) or other machine-to-machine communication techniques). For example, sports scores could be provided by a third party sports app, such as an ESPN app.

In the present situation, natural language generation can use known rules to create a given sentence. For example, the backend system can take the known portion of the response, such as "Today, the weather in Seattle this afternoon will be XXXXX," and start to generate the output data (e.g., MP3, MPEG or other audio/multi-media formatted data) using the known information, while generating room for the missing factual information that will be provided by the skill (in this case, the XXXXX would simply be empty). While the backend system is generating the known portion of the response, the selected skill is attempting to retrieve the requested information. Once the requested information has been received, that information is passed to the backend system which can apply text-to-speech processing to format the information for placement in the remaining part the response. The parts of the output response that have been generated and processed can be sent to the electronic device at any time, and the electronic device can then output the parts it receives through one or more speakers to the user.

This system is advantageous over previous methods and systems because, among other reasons, it enables users to obtain information with lower latency. For example, compared to previous system architectures, response time can be lowered 100 milliseconds or more. While such delays may seem inconsequential, such delays can lead to a feeling or heightened awareness of the fact that the user is interacting with a machine, where delay causes the user to become more cognizant of waiting for the response to come from the electronic device. Reducing latency, however, is a difficult technical problem, at least because many latencies can be difficult to predict and can be unavoidable, as they can be attributed to a variety of factors. For example, there can be latencies introduced by the backend system itself depending on the load on the system, such as if an unusually large number of users access the weather skill at the same time. There can be additional latencies introduced into the system due to transmission issues between the backend system and the electronic device, such as latencies caused by the local area network the electronic devices in located on, or even the loading on the internet itself. There can be additional latencies caused by the electronic device itself, for example, if the device was asked to set an alarm for a given time prior to being asked what the weather was going to be. Moreover, it should be noted that the time required to play the entire response will be more than the time to process the response, so it could be conceivable that the output of the response could be sent to the speakers before the actual requested information has been obtained.

Accordingly, it would be beneficial, in accordance with various embodiments disclosed herein, for the backend system and electronic device to operate in a manner that can reduce the total latencies otherwise inherent in the overall system. This could provide the user with near instantaneous responses which the user may experience as something akin to an actual, interactive conversation. In that case, the user might ask a question and get what feels like an immediate response. The immediate response could inspire the user to ask additional questions, such that the user has an enjoyable and beneficial overall experience.

In order to compensate for some of the latencies that are inherent in the overall system and between the backend system and the electronic device, the backend system can perform several tasks in a different manner. The backend system can start processing the output data before the user even finishes making the request for information. In order to accomplish that, the backend system can start to process and analyze the data being received from the electronic device as the individual bits of information or blocks of information are received. This process can include applying ASR techniques to go from recorded speech to text, and applying NLU techniques to determine the meaning of the text. Instead of waiting for the receipt of the entire request, the system can begin processing the output as soon as the system determines which skill is appropriate to provide a response to the request.

In order to create output data consistent with the selected skill, the backend system can pre-generate one or more portions of the output data leaving room for the specific information sought by the user. If, for example, the user asked "Who was the 16$^{th}$ President?" the system can pre-generate the output data with "The 16$^{th}$ president was" while waiting for the skill to determine the answer to the question. In order to synthesize the output data, the backend system could break down the intended output sentence into a series of units, whereby each unit could be, for example, and individual phoneme. The backend system could then analyze the phonemes in order to try and determine the best sequence of phonemes that would generate the smoothest or simplest output response. As described herein, "smoothest" generally refers to a sequence of phonemes in which the transition from one phoneme to the next is as gradual and transparent as feasible given the available phonemes for a given response. A transition between two phonemes would be highly "smooth" if the two phonemes essentially appeared to be a single unit because the transition point from one to the other was not distinguishable.

The determination of the sequence of phonemes that may be most efficient and that would produce output data that a user would find desirable to listen to can be accomplished through a variety of techniques. The backend system can start by determining what all of the different combinations of phonemes might be for the output data. Then one or more dynamic programming techniques can be applied, such as hidden Markov models, state transition models, Viterbi algorithms, etc., in order to determine which combination may provide output data that would produce a spoken sentence that may sound as if it were spoken by a human being. In synthesizing the partial output data, it may be beneficial for the backend system to know the temporal locations of where room will be left for the specific information sought by the request (such as the score of a specific game), which can further aid in insuring that the transitions between units—even unknown units—can be as smooth as possible.

It may also be helpful in synthesizing the output data to view two different factors—model cost and concatenation cost. Model cost can be viewed as an overall indicator of the smoothness of the potential output data, in which case the overall structure of the potential output data must be analyzed. The lower the model cost, the more likely it is that a person hearing the output data played by speakers might believe it was an actual recording of a human being, instead of generated speech. One factor involved in model cost is related to a rating for each speech unit that can be based, for example, on acoustic similarity or surrounding words (which should result in smoother output data). Other factors that influence model cost also include the differences in multiple choices available for the same speech unit, such as the same word or phrase. These choices can, for example, include the use of different accents and/or which syllable in a given word is emphasized. In that case, that there might be more than 40 or 50 different choices available to select from for a single word. These difference choices could include saying the same word in a given language with an accent from any one of many other languages, such as the word "dog," but spoken by an individual who's natural language is French, German, Polish, Russian, etc.

Concatenation cost, on the other hand, relates to the overall cost of the individual transitions from one speech unit to another (such as, phoneme-to-phoneme, diaphone-to-diaphone, word-to-word, etc.). Concatenation cost can also be based on different factors. For example, if one phoneme is loud and the next phoneme in sequence is quiet, the concatenation cost would be high because the transition between those two phonemes would be difficult to synthesize smoothly. Another factor can be the roughness or smoothness of two speech units when compared to each other, such as where the transition from one rough speech unit to another rough speech unit may itself result in a low concatenation cost because there would be little change in the output data from unit to unit, even though such rough units may contribute to a high model cost. In this case, the transition from speech unit to speech unit can be synthesized smoothly, but the resultant data may still be rough due to the individual speech units themselves. The end goal of the synthesis is to produce output data having the lowest sum of model cost and concatenation cost.

Figure 1:
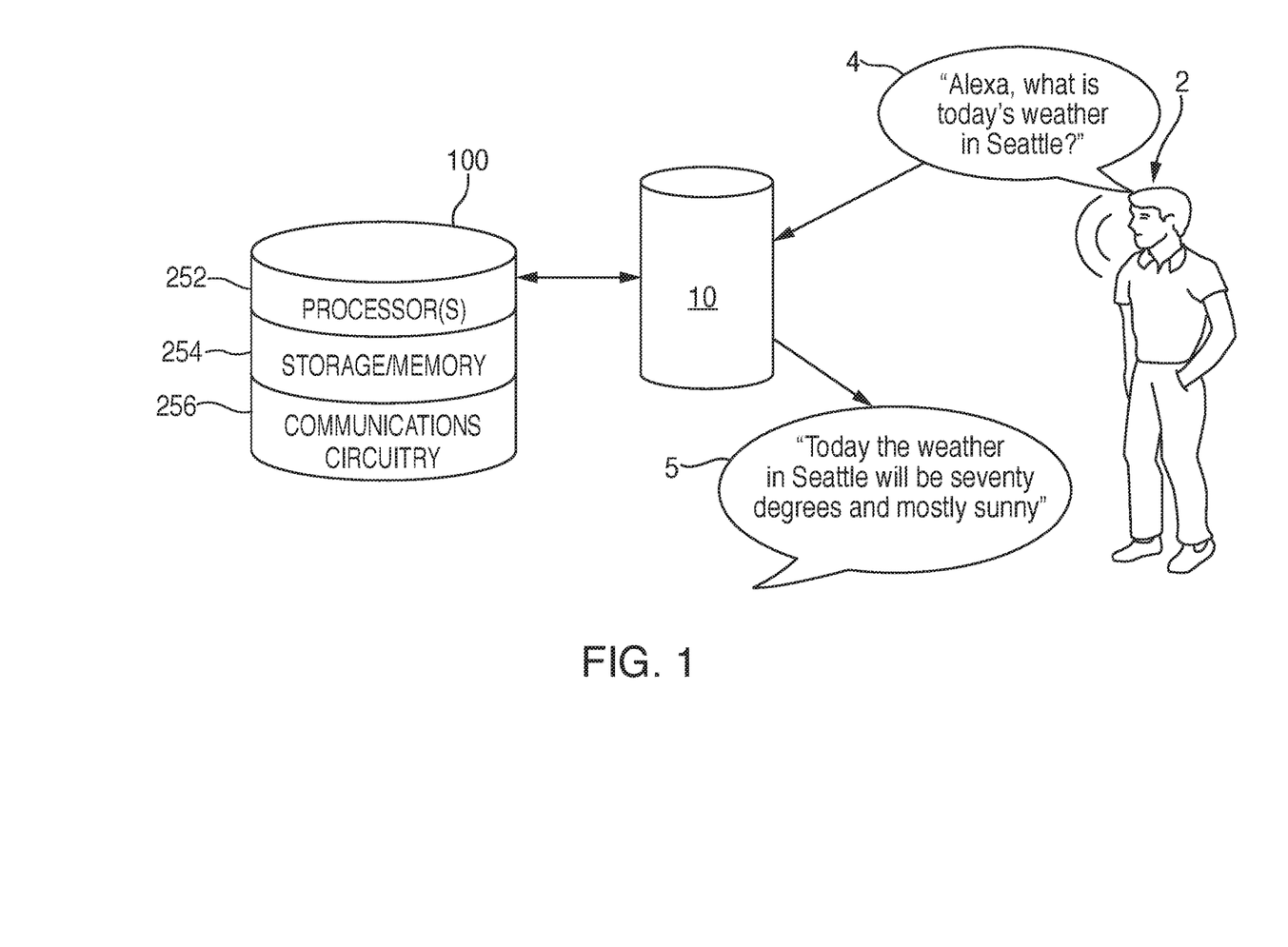
FIG. 1 is an illustrative diagram of a system for communicating with a backend system to provide a response to a request.

FIG. 1 is an illustrative diagram of a system for communicating with a backend system to provide responses to user queries in accordance with various embodiments. In one exemplary non-limiting embodiment, an individual 2 may speak request 4 within a remote environment where a voice activated electronic device 10 (such as an Amazon Echo), as described in greater detail below, is located. Request 4 may be any question, inquiry, instruction, phrase, or other set of one or more words/sounds. For example, individual 2 may say, "Alexa, what is today's weather in Seattle?" However, alternative or additional requests to ask the same question may include, but are not limited to, "What is today's weather, Alexa?" or "How is the weather in Seattle, Alexa?" In each instance, "Alexa" has a special connotation in that it may be referred to as a wakeword, or activation word (the wakeword would be a different word, or a particular phoneme or a particular sound, such as the sound made by clapping or snapping your fingers). In particular, a wakeword may be detected within an audio signal detected by one or more microphones located on voice activated electronic device 10. Persons of ordinary skill in the art will recognize, however, that the one or more microphones may alternatively be located on a separate device in communication with voice activated electronic device 10. In some embodiments, after the wakeword is detected, voice activated electronic device 10 may begin interpreting/analyzing audio until no more speech is detected by the audio input device(s).

In general, device 10 constantly listens for the wakeword and is otherwise inactive. Once the wakeword is recognized, device 10 switches from a passive mode to an active mode. It should be noted that the wakeword does not have to be the first word or sound in a given sentence or request. Device 10 can be configured such that it can record and store a limited amount of audio data that should, in most instances, be the amount of time needed to speak a sentence or more. Accordingly, even if a wakeword is recognized in the middle or end of a sentence, device 10 will have retained the entire sentence which can then be analyzed by the backend systems to determine what is being requested.

Once device 10 becomes active it receives the request from user 2 in the form of spoken words that are recorded and converted to digital audio data (e.g., MP3 data). In accordance with various embodiments disclosed herein, the contents of the digital audio data are essentially streamed to backend system 100 such that at least a portion of the digital audio data can be received by backend system 100 and analysis can begin on that portion and any subsequent portions immediately upon receipt. In particular, backend system 100 can embark on processing one or more portions of the digital audio data prior to the user having completed making the request for information. Thus, backend system 100 can start analyzing whatever portion of the digital audio data it received through a variety of techniques such as automatic speech recognition (ASR) and natural language understanding (NLU) to convert the audio data into a series of identifiable words, and then to analyze those words in order to interpret the meaning of the request from user 2. Backend system 100 utilizes ASR techniques to recognize the spoken words that were recorded and stored in the MP3 data and to translate them into known text that can then be analyzed by NLU techniques to attempt to decipher the meaning of the request from user 2.

Any suitable computer implemented speech-to-text technique may be used to convert the received audio signal(s) into text, such as SOFTSOUND speech processing technologies available from the Autonomy Corporation, which is headquartered in Cambridge, England, United Kingdom. In some embodiments, one or more filters may be applied to the received audio data to reduce or minimize extraneous noise, however this is not required.

Backend system 100 includes multiple instances of processor(s) 252, storage/memory 254 and communications circuitry 256, each of which may be utilized in connection with one or more servers as is described in more detail below. Backend system 100 operates to analyze the incoming request for information in order to determine what is being requested, and then either gathers the requested information internally, and/or accesses a third party skill to retrieve the information. In accordance with various embodiments herein, backend system 100 begins synthesizing the output audio data and transmitting portions of the synthesized data back to electronic device 10 even before the requested information has been retrieved.

As shown in FIG. 1, for example, user 2 asks "Alexa, what is today's weather in Seattle?" The spoken words are received by one or more microphones within electronic device 10 (or are remote microphones coupled to device 10 to provide device 10 with the signals that are received by the remote microphones), and are converted to digital audio data and uploaded to backend system 100. This process can occur as the words are received by the microphones, such that backend system 100 receives a portion of the converted audio data prior to the time that the user completes speaking the request. While user 2 continues to speak, backend system 100 determines that the subject or topic of the request is the weather, and immediately begins generating and synthesizing the audio output data (again, this may occur prior to the request being completed by user 2).

Once subject has been determined, different things can happen. If the requested information can be obtained internal to the back end system, the backend system can begin the process of generating the output response in portions. For example, once the text for a first portion has been generated, the text for the second portion could be generated, taking into account the last speech unit of the first portion. Once the second portion was generated, the first portion could be synthesized into output audio data and sent to the electronic device. Alternately, if the requested information is going to be obtained through a third party skill, the back end system could still generate portions of the output response data, leaving room for the specific requested information that the skill would provide. In other embodiments, the third party skill could provide the generated audio output data for some or all of the portions of the output response. This could be accomplished through the use of one or more templates, based on the user's request. In still other embodiments, the third party skill could provide a template for a portion of the output response, with the back end system generating the remaining portions of the response. Accordingly, depending on the embodiment, the third party skill can provide as little as the specific information sought, that information and a template for generating the output response, the entire output response, or any combination thereof.

In the example shown in the figures and described herein, the backend system generates the output response. Backend system 100 begins by generating "Today, the weather" as the first portion of the output response and "in Seattle will be" as the second portion. Once the second portion is known, and therefore the transition from the first portion to the second portion is also known, then the first portion can be synthesized into digital audio output data (as is described in more detail below, the synthesis includes accounting for the transition from the first portion to the second portion), and transmitted to electronic device 10 as soon as it has been synthesized (generating can be thought of as the process of select the words for the response and the ordering of those words, which can vary for a number of reasons that are described in more detail below, while synthesizing can be thought of as processing the generated sequence of words into the format of the output data, such as MP3 format or MPEG format). Thus, electronic device 10 may, in fact, have received a portion of the audio output data prior to having transmitted all of the audio data that represents the complete request to backend system 100. Once backend system 100 receives all of the audio input data that represents the user's request and processes it to determine the meaning of what has been requested, the sought-after information can be obtained from the appropriate skill, the remaining portions of the response can be generated, then the generated portions can be synthesized into one or more additional portions of the audio output data (via, for example, techniques such as text-to-speech ("TTS")), and transmitted to electronic device 5 so that the response to the request may be output on one or more speakers. Thus, as shown in FIG. 1, one or more speakers on electronic device 10 can output audio data received from the back end system as "Today, the weather in Seattle will be seventy degrees and mostly sunny."

The digital audio data (e.g., MP3, MPEG, etc., formatted data) may be transmitted over a network, such as the Internet, to backend system 100 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between voice activated electronic device 10 and backend system 100. In some embodiments, voice activated electronic device 10 and backend system 100 may communicate with one another via a web browser using HTTP. Various additional communication protocols may be used to facilitate communications between voice activated electronic device 10 and backend system 100 including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, Bit-Torrent, FTP, RTP, RTSP, SSH, and/or VOIP.

Figure 2:
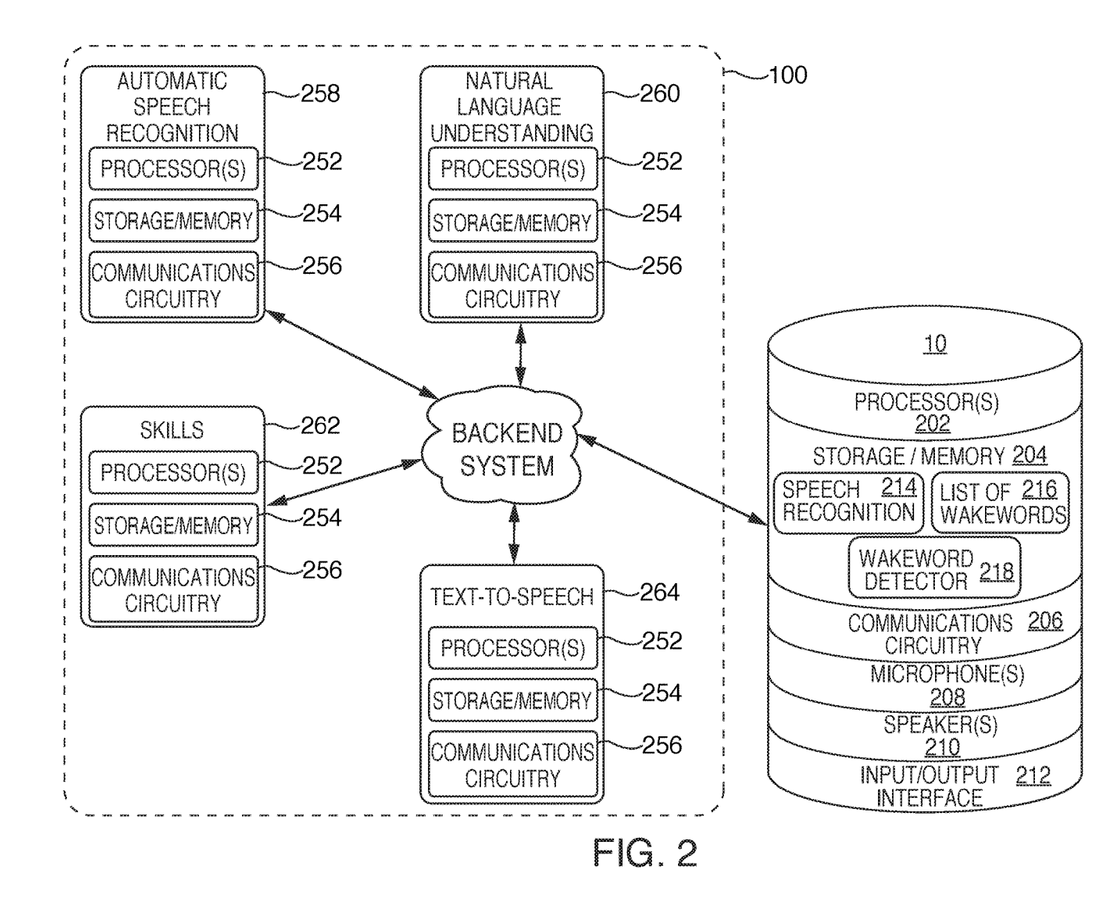
FIG. 2 is an illustrative diagram of the system of FIG. 1 in accordance with various embodiments.

FIG. 2 is an illustrative diagram of the system of FIG. 1 in accordance with various embodiments, in which more details of each of electronic device 10 and backend system 100 are shown and described. Voice activated electronic device 10, in some embodiments, may correspond to any type of electronic device capable of being activated in response to detecting a specific sound. Voice activated electronic device 10 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, desktop computers, mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories. In some embodiments, voice activated electronic device 10 may be relatively simple or basic in structure such that no mechanical input option(s) (e.g., keyboard, mouse, trackpad) or touch input(s) (e.g., touchscreen, buttons) may be provided. For example, voice activated electronic device 10 may be capable of receiving and outputting audio, and may include power, processing capabilities, storage/memory capabilities, and communication capabilities.

Voice activated electronic device 10 may include a minimal number of input mechanisms, such as a power on/off switch, however primary functionality, in one embodiment, of voice activated electronic device 10 may solely be through audio input and audio output. For example, voice activated electronic device 10 may listen for a wakeword by continually monitoring local audio. In response to the wakeword being detected, voice activated electronic device 10 may establish a connection with backend system 100, send audio data to backend system 100, and await/receive a response from backend system 100. In some embodiments, however, non-voice activated devices may also communicate with backend system 100 (e.g., push-to-talk devices).

Voice activated electronic device 10 may include one or more processors 202, storage/memory 204, communications circuitry 206, one or more microphones 208 or other audio input devices (e.g., transducers), one or more speakers 210 or other audio output devices, as well as an optional visual input/output ("I/O") interface 212. However, one or more additional components may be included within voice activated electronic device 10, and/or one or more components may be omitted. For example, voice activated electronic device 10 may include a power supply or a bus connector. As another example, voice activated electronic device 10 may not include a visual I/O interface. Furthermore, while multiple instances of one or more components may be included within voice activated electronic device 10, for simplicity only one of each component has been shown.

Processor(s) 202 may include any suitable processing circuitry capable of controlling operations and functionality of voice activated electronic device 10, as well as facilitating communications between various components within voice activated electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for voice activated electronic device 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on voice activated electronic device 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include one or more modules and/or databases, such as speech recognition module 214, list of wakewords database 216, and wakeword detection module 218. Speech recognition module 214 may, for example, include an automatic speech recognition ("ASR") component that recognizes human speech in detected audio. Speech recognition module 214 may also include a natural language understanding ("NLU") component that determines user intent based on the detected audio. Also included within speech recognition module 214 may be a text-to-speech ("TTS") component capable of converting text to speech to be outputted by speaker(s) 210, and/or a speech-to-text ("STT") component capable of converting received audio signals into text to be sent to backend system 100 for processing.

List of wakewords database 216 may be a database stored locally on voice activated electronic device 10 that includes a list of a current wakeword for voice activated electronic device 10, as well as one or more previously used, or alternative, wakewords for voice activated electronic device. In some embodiments, individual 2 may set or program a wakeword for voice activated electronic device 10. The wakeword may be programmed directly on voice activated electronic device 10, or a wakeword or words may be set by the individual via a backend system application (app) that is in communication with backend system 100. For example, individual 2 may use their mobile device having the backend system application running thereon to set the wakeword. The specific wakeword may then be communicated from the mobile device to backend system 100, which in turn may send/notify voice activated electronic device 10 of the individual's selection for the wakeword. The selected activation may then be stored in database 216 of storage/memory 204.

Wakeword detection module 218 may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice activated electronic device 10 may then begin transmitting the audio signal to backend system 100 for detecting and responds to subsequent utterances made by individual 2.

Communications circuitry 206 may include any circuitry allowing or enabling voice activated electronic device 10 to communicate with one or more devices, servers, and/or systems. For example, communications circuitry 206 may facilitate communications between voice activated electronic device 10 and backend system 100. Communications circuitry 206 may use any communications protocol, such as any of the previously mentioned exemplary communications protocols. In some embodiments, voice activated electronic device 10 may include an antenna to facilitate wireless communications with a network using various wireless technologies (e.g., Wi-Fi, Bluetooth, radiofrequency, etc.). In yet another embodiment, voice activated electronic device 10 may include one or more universal serial bus ("USB") ports, one or more Ethernet or broadband ports, and/or any other type of hardwire access port so that communications circuitry 206 allows voice activated electronic device 10 to communicate with one or more communications networks.

Voice activated electronic device 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, voice activated electronic device 10 may include multiple microphones (e.g., four, seven, ten, etc.) placed at various positions about voice activated electronic device 10 to monitor/capture any audio outputted in the environment where voice activated electronic device 10 is located. The various microphones 208 may include some microphones optimized for distant sounds, while some microphones may be optimized for sounds occurring within a close range of voice activated electronic device 10.

Voice activated electronic device 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where voice activated electronic device 10 may be located. In some embodiments, speaker(s) 210 may include headphones or ear buds, which may be wirelessly wired, or hard-wired, to voice activated electronic device 10, that may be capable of broadcasting audio directly to individual 2.

In some embodiments, one or more microphones 208 may serve as input devices to receive audio inputs, such as speech from individual 2. Voice activated electronic device 10, in the previously mentioned embodiment, may then also include one or more speakers 210 to output audible responses. In this manner, voice activated electronic device 10 may function solely through speech or audio, without the use or need for any input mechanisms or displays.

In one exemplary embodiment, voice activated electronic device 10 includes I/O interface 212. The input portion of I/O interface 212 may correspond to any suitable mechanism for receiving inputs from a user of voice activated electronic device 10. For example, a camera, keyboard, mouse, joystick, or external controller may be used as an input mechanism for I/O interface 212. The output portion of I/O interface 212 may correspond to any suitable mechanism for generating outputs from electronic device 10. For example, one or more displays may be used as an output mechanism for I/O interface 212. As another example, one or more lights, light emitting diodes ("LEDs"), or other visual indicator(s) may be used to output signals via I/O interface 212 of voice activated electronic device 10. In some embodiments, one or more vibrating mechanisms or other haptic features may be included with I/O interface 212 to provide a haptic response to individual 2 from device 10. Persons of ordinary skill in the art will recognize that, in some embodiments, one or more features of I/O interface 212 may be included in a purely voice activated version of electronic device 10. For example, one or more LED lights may be included on voice activated electronic device 10 such that, when microphone(s) 208 receive audio from individual 2, the one or more LED lights become illuminated signifying that audio has been received by voice activated electronic device 10. In some embodiments, I/O interface 212 may include a display screen and/or touch screen, which may be any size and/or shape and may be located at any portion of voice activated electronic device 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

The system shown in FIG. 2 also includes backend system 100, as mentioned previously, which may be in communication with voice activated electronic device 10. Backend system 100 includes various components and modules including, but not limited to, automatic speech recognition ("ASR") module 258 (which may include, for example, speech-to-text ("STT") functionality), natural language understanding ("NLU") module 260, skills module 262, and text-to-speech ("TTS") module 264. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for cloud-based information system 100, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used.

ASR module 258 may be configured such that it recognizes human speech in detected audio, such as audio captured by voice activated electronic device 10, which is then transmitted to backend system 100. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions of the latter may apply. NLU module 260 may be configured such that it determines user intent based on the detected audio received from voice activated electronic device 10. NLU module 260 may include processor(s) 252, storage/memory 254, and communications circuitry 256.

Skills module 262 may, for example, correspond to various action specific skills or servers capable of processing various task specific actions. Skills module 262 may further correspond to first party applications and/or third party applications operable to perform different tasks or actions. For example, based on the context of audio received from voice activated electronic device 10, backend system 100 may use a certain application or skill to retrieve or generate a response, which in turn may be communicated back to voice activated electronic device 10. Skills module 262 may include processor(s) 252, storage/memory 254, and communications circuitry 256. As an illustrative example, skills 262 may correspond to one or more third party app servers for storing and processing information related to different apps (e.g., a sports app, a news app, a cooking app, a stock market app, etc.). As another example, skills 262 may include one or more weather servers for storing weather information and/or providing weather information to voice activated electronic device 10.

TTS module 264 may employ various text-to-speech techniques, which are described in greater detail above. However, techniques for taking text and converting it into audio data that can represent speech are well known in the art and need not be described in further detail herein, any suitable computer implemented techniques may be used. TTS module 264 may also include processor(s) 252, storage/memory 254, and communications circuitry 256.

Persons of ordinary skill in the art will recognize that although each of ASR module 258, NLU module 260, skills module 262, and TTS module 264 include instances of processor(s) 252, storage/memory 254, and communications circuitry 256, those instances of processor(s) 252, storage/memory 254, and communications circuitry 256 within each of ASR module 258, NLU module 260, skills module 262, and STT/TTS module 264 may differ. For example, the structure, function, and style of processor(s) 252 within ASR module 258 may be substantially similar to the structure, function, and style of processor(s) 252 within NLU module 260, however the actual processor(s) 252 need not be the same entity.

Figure 3A:
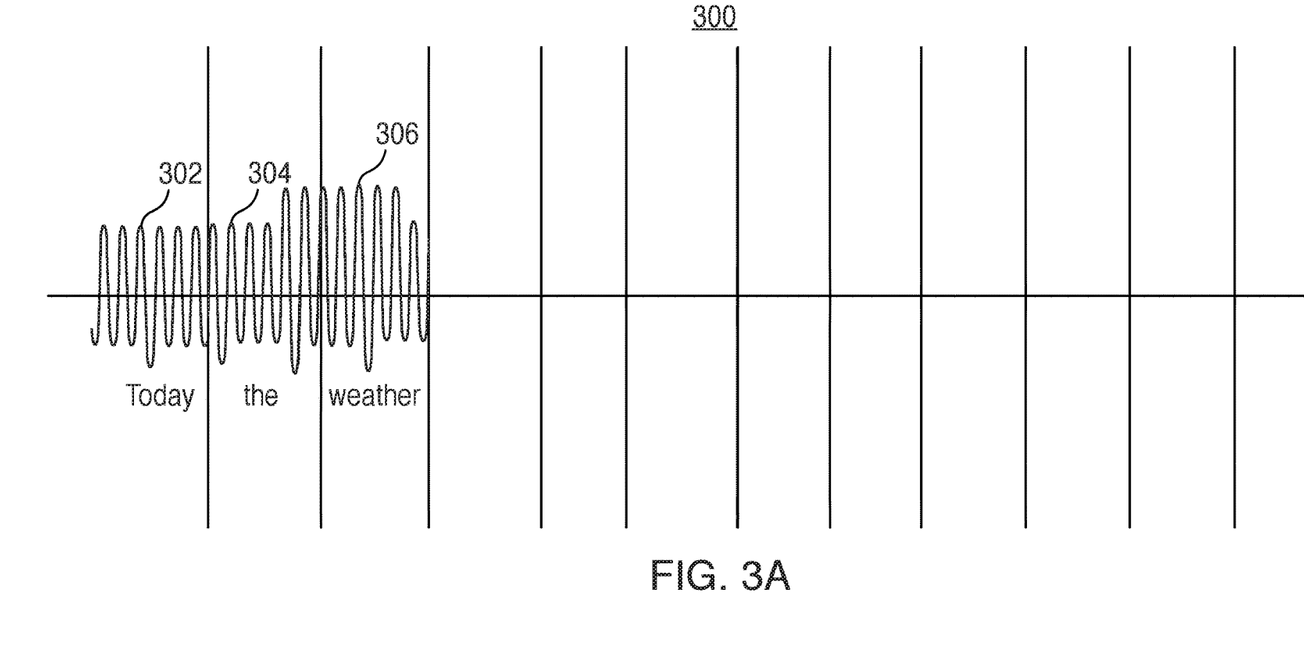
FIGS. 3A-3C are illustrative graphs showing the construction of an output response in accordance with various embodiments.
Figure 3B:
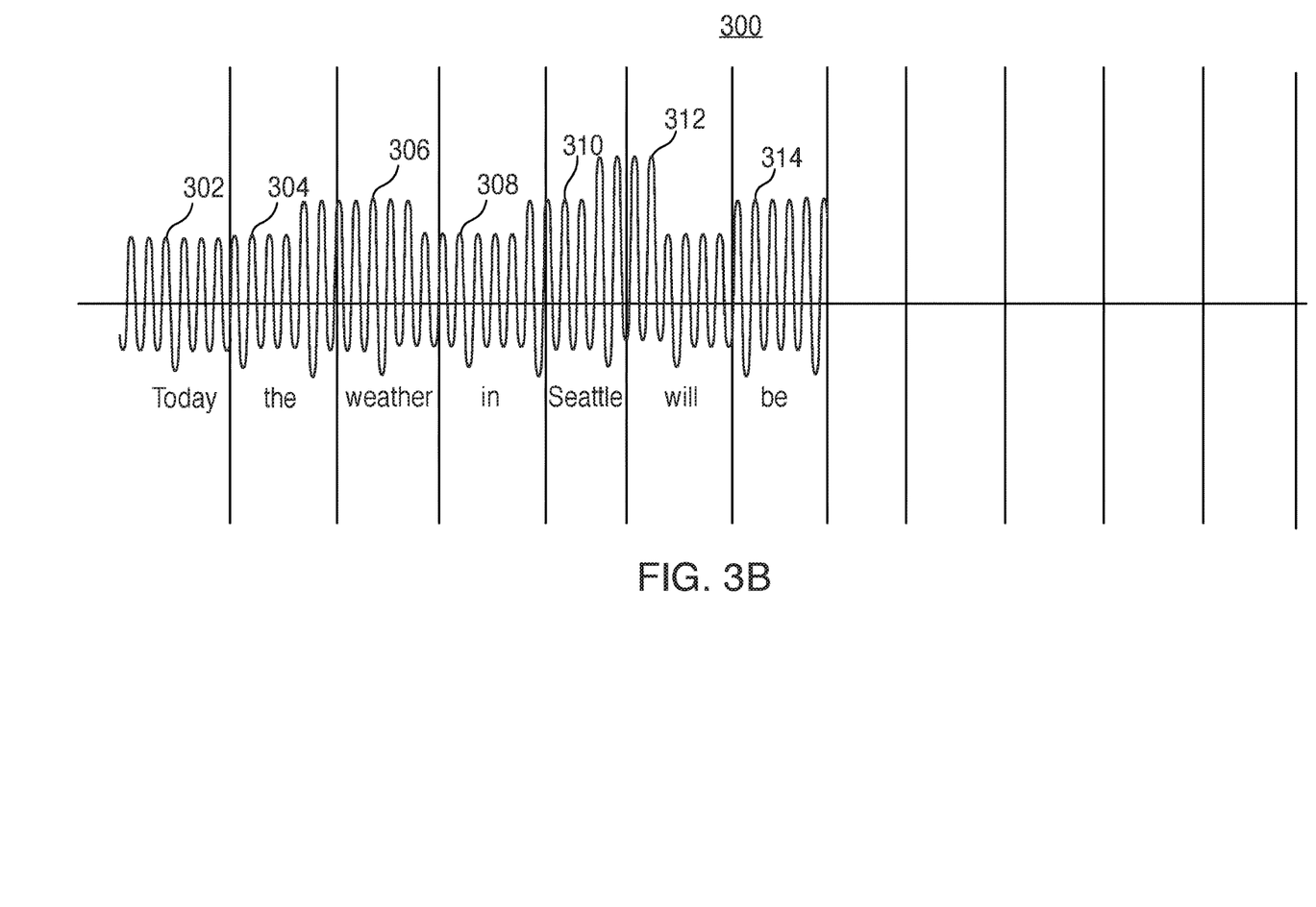
Figure 3C:
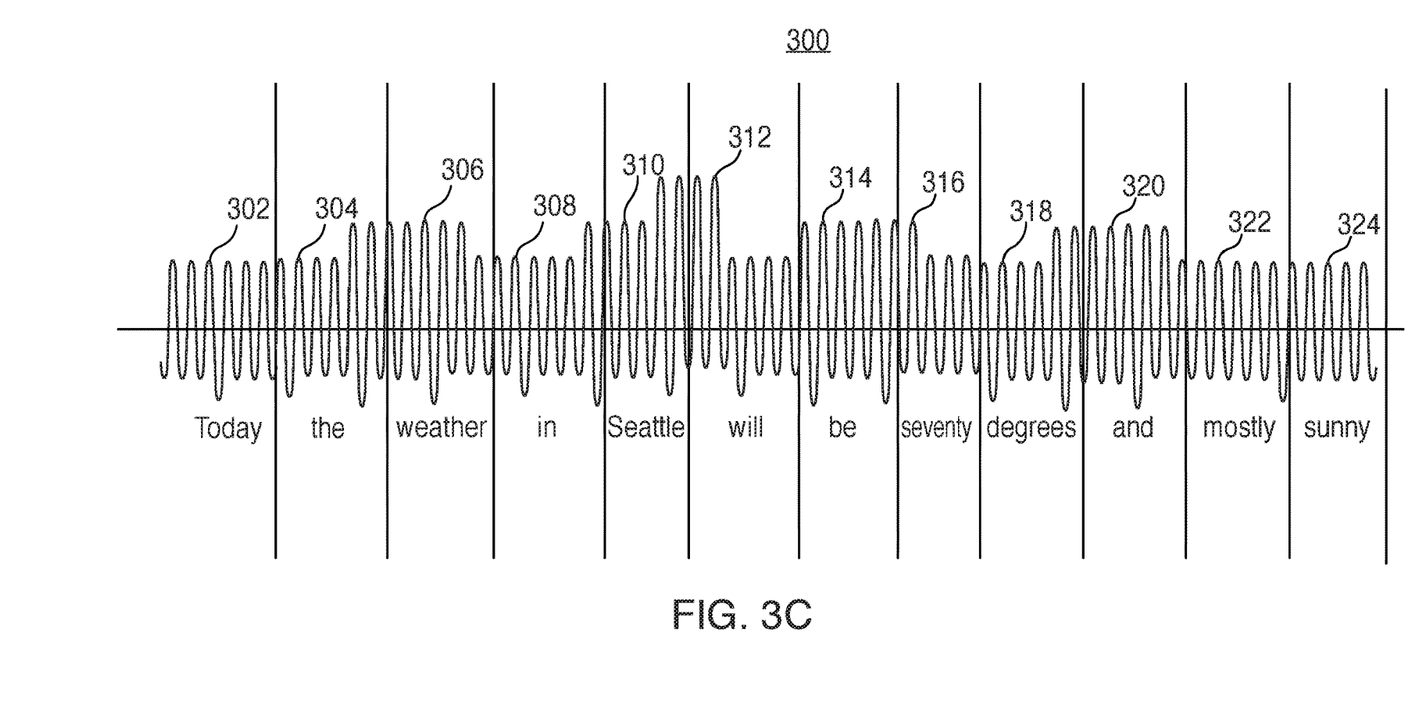

FIGS. 3A-3C are illustrative graphs showing the results of the construction and synthesis of an output audio response in accordance with various embodiments described herein. In the example shown in FIGS. 3A-3C, user 2 asks electronic device 10 about the weather in Seattle (see FIG. 1). FIG. 3A shows the result of the initial synthesis of a portion of the output audio data based on the preliminary analysis of a portion of the audio input data received from electronic device 10. Because the results of the preliminary analysis identified the request as being related to the weather in Seattle, backend system 100 performed a synthesis of a portion of the audio output data as shown in FIG. 3A. In this instance, waveform 300, which will ultimately be the output audio waveform of the response to the request, shows three sub-waveforms, 302-306, each representing one of the words of the final audio output data. While words are shown in the illustration of FIGS. 3A-3C, persons of ordinary skill in the art will appreciate that backend system 100 may produce more efficient and higher quality audio output data by utilizing phonemes instead of words in the synthesis of the output waveforms. In this example, however, sub-waveform 302 represents the word "Today," sub-waveform 304 represents the word "the," and sub-waveform 306 represents the word "weather."

In accordance with various embodiments disclosed above and below, the synthesis of the output audio data involves selecting the speech units (in this case words, in other instances phonemes) that provide the smoothest transition from sub-waveform to sub-waveform (or unit to unit), such that the waveforms, when output on a speaker, would sound as if the words blended together as if spoken by a human being instead of being choppy and harsh and sounding as if they were generated by a machine. An examination of the illustration shown in FIG. 3A shows that the transition between sub-waveforms 302 and 304 shows little to no variance at the high amplitude and only a slight variance at the low amplitude of the wave form at the transition, and thus would result in a low concatenation cost and have a small effect on the overall model cost. The transition from sub-waveform 312-314 (as shown in FIG. 3B), on the other hand, is more severe, at both the high and low amplitudes during the transition. That transition would have a higher concatenation cost which would raise the overall model cost of the final synthesized waveform. Moreover, as previously described and in accordance with embodiments disclosed herein, backend system 100 can transmit the synthesized portion of the output waveform 300 shown in FIG. 3A to electronic device 10 without waiting for the remaining portions of the output waveform to be synthesized. This may result in that portion of the output audio data arriving at electronic device 10 prior to user 2 having completed making the request.

FIG. 3B shows the result of the initial portion of the output waveform from FIG. 3A being supplemented with an additional portion that was synthesized after backend 100 determined that the weather request related to "this afternoon," and backend system 100 generated the sequence of words for the remaining portion of the output data (such that the transition between the second and third portions could be determined). As a result, additional synthesis can occur to form an additional portion of the output audio data, in this instance shown as sub-waveforms 308-314. While FIG. 3B shows sub-waveforms 308-314 on the same graph as the portion that was synthesized with respect to FIG. 3A, persons skilled in the art will appreciated that the two synthesized waveform portions need not be combined by backend system 100 or electronic device 10, and instead, can be transmitted separately to electronic device 10 to be output on one or more speakers on that device as the portions are received by device 10. For purposes of illustration, however, when the embodiments disclosed herein are practiced, one-third of the audio output data can be fully synthesized prior to backend system 100 having the answer to the request (or the request even being completed by the user). Moreover, synthesized portions of the audio output data can be transmitted to electronic device 10 as they are synthesized instead of waiting for the complete audio output response to be completed.

FIG. 3C shows the result of what the final audio waveform response should look like if all of the units were synthesized together to form a complete waveform 300. In this instance, backend system 100 utilized one or more weather skills to determine that the weather in Seattle was going to be seventy degrees and sunny, and synthesized sub-waveforms 316-324 to represent the remaining portion of the audio representation of those words. While FIG. 3C shows the entire waveform 300, persons skilled in the art will appreciate that the only sub-waveforms that may need to be transmitted to electronic device 10 would be the synthesized portion that includes sub-waveforms 316-324, assuming that the other portions have already been synthesized and transmitted. In this manner, by transmitting portions of the audio output data as soon as they are synthesized, many if not all of the latencies inherent in the system can be overcome, resulting in an enhanced user experience where the response to the request can be provided in a manner that suggests to the user that the system already knew what was being asked and had the answer ready and waiting.

Figure 4:
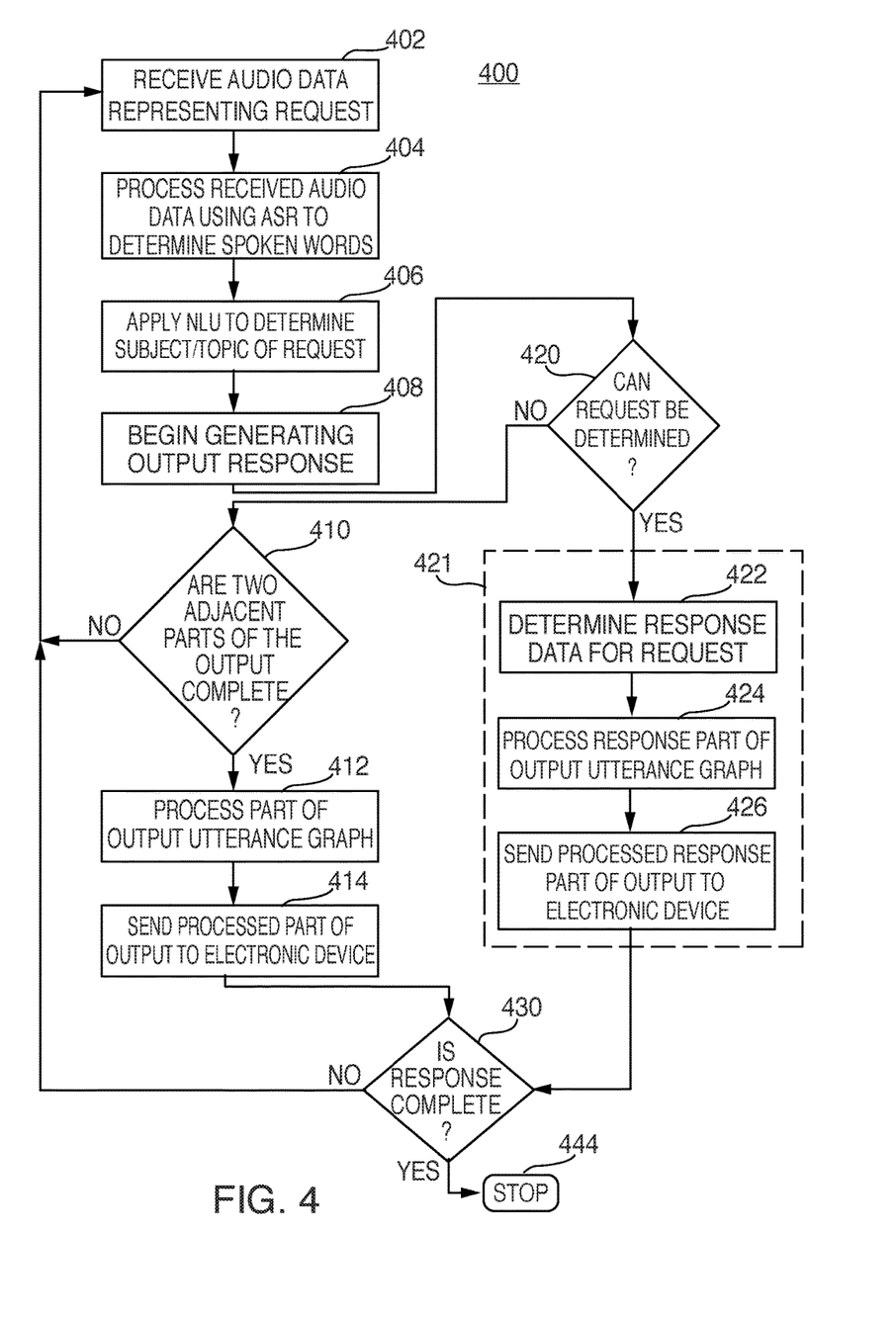
FIG. 4 is an illustrative flowchart of a process for processing various components of an output response into the output response in accordance with various embodiments.

FIG. 4 is an illustrative flowchart of a process 400 that, in accordance with various embodiments, synthesizes audio output data in incremental parts that, when combined together, represents a response to a request by a user. Process 400 includes a sequence of process steps that can be repeated until each portion of the response has been generated, excluding the portion that contains the information requested by the request itself (which is shown separately as process steps 421). At step 402, audio data representing speech is received that relates to a portion of the request from the user. Step 402 may be performed as soon as enough audio data is received, even if the electronic device is still receiving the request from the user. The audio data is received by, and recorded by, the electronic device, which converts it to digital audio data and transmits the converted data to the backend system for processing, as described above. Step 402 represents the backend system receiving the converted audio data that has been transmitted by the electronic device.

At step 404, the backend system begins processing the received audio data, which represents only a portion of the user's request. Step 404 includes processing the received audio data using automatic speech recognition (ASR) techniques in order to attempt to determine what words were spoken by the user and received by the microphone coupled to the electronic device. These techniques can also include speech-to-text processing that ultimately converts the audio data into known words. Once the ASR processing has been accomplished, further processing occurs at step 406 of the known words in an effort to determine the subject and/or topic of the request. This step is not necessarily seeking to determine exactly what information the user is seeking, but can instead try to figure out the type of information the user is seeking. For example, is the user seeking information about the weather, sports scores, stock market prices, historical trivia, recipe information, directions, etc.? Once the subject of the request has been determined, a portion of the output system can be generated in step 408 (as described above and more specifically below, generating can be selecting the specific speech units and order of those units for a given portion of the output response).

If the specific request for information is not determined during step 420, for example, that only the general or specific topic of the request is identified, control transfers to step 410 to determine whether processing of any portion of the output utterance graph can occur (i.e., the generating and synthesizing of a portion of the audio output response into actual audio data, e.g., MP3 data, MPEG data, etc), to produce audio data that can eventually be output by one or more speakers on the electronic device to the user. As described above and below, step 412 includes generating a portion of the output response into speech units and synthesizing those speech units into an utterance graph (again, a unit can be considered to be the smallest component of sound that can be used to form a response, such as a phoneme, or a unit can be a larger unit, such as a word or group of words). This process can include selecting the speech units, arranging them in various combinations consistent with the topic of the request and other factors that are more fully described below, leaving room for the actual information that was requested by the user, if necessary. If two adjacent portions are not yet generated, control returns to step 402 to process the next portion (two adjacent portions of the output response should be generated prior to synthesis into the audio output data to insure a smooth transition between the portions).

Step 412 seeks to arrange the units in an order such that the arrangement represents the smoothest set of transitions from unit to unit, and that will provide the most natural sounding audio when that portion of the output response is output by the speakers. The entire portion of the audio output response being processed can, as is described below, have an overall model cost based on all of the unit-to-unit transitions in that portion, as well as other factors. In addition, each individual transition from one unit to the next can have an associated concatenation cost for which a low value is desired that represents a smooth transition from unit to unit. For example, the concatenation cost will be high and therefore undesirable if one unit is particularly loud and the next unit is quiet. That might represent someone yelling and then being instantly silent (a sharp contrast). The model cost can also be affected by the overall structure of the output sentence, the selection of individual words, etc. For example, the model cost can be affected by location of where the room is left in the output response for the specific information that will be provided by a skill.

Overall, the output of a given portion of audio data will most likely sound the best (i.e., most closely matching what a human being might sound like saying the same portion of text out loud) to a user when the sum of the model cost and the concatenation cost are low. That may be accomplished, for example, by simply switching the order of some of the words in the output data, or selecting a different accent for a given word or phrase. For example, in response to a request about the weather, two different responses to the same question could be: (1) "The weather in Seattle tomorrow will be XXXX"; and (2) "Tomorrow's Seattle weather will be XXXX." Each of these sequences of units (assuming the units in this instance are words) conveys the same information, but may have drastically different model and concatenation costs. It would be preferable for the backend system to select the configuration in which the sum of the costs is the lowest. Once the backend system selects the arrangement of units having the lowest costs and arranges the units accordingly, and then synthesizes those units into audio data (after looking forward to the next portion to process the transition between portions), that synthesized portion of the audio output data can be sent to the electronic device in a step 414. Then, in step 430, the backend system determines whether the output response is complete. If the output response is complete, the process stops at step 444, if not, the process continues back at step 402.

If the specific request for information is determined during step 420, control transfers from step 420 to a sequence of steps 421 (illustrated by the dashed box shown in FIG. 4). Sequence 421 includes steps 422, 424 and 426, as described below. At step 422, the backend system may be able to determine the specific response to the user request internally, or the backend system may utilize one or more third party skills to find the requested information. For example, if the user request related to the score of the Seattle Seahawks football game, the backend system may have that information available internally, or the backend system may seek that information from a third party skill, such as an ESPN skill or a skill from the Seattle Seahawks football team. Similarly, if the user requests the current price of Amazon stock, that might be known internally, or the backend system could utilize a skill from any one of many known brokerage companies, or a skill based on something like the Yahoo finance webpage. In any case, once step 422 determines the specific information that was being sought, the information can be processed accordingly and control is transferred to step 424. At step 424, similar to step 412 previously described, the generation and synthesis of the output response into an utterance graph for the determined response is accomplished. This process may be very simple depending on what and how much determined information is responsive to the request, and how much or how little the skill provides to the backend system. For example, one request about the weather could result in a very specific response, such as "What is the temperature outside?" versus the "what will the weather be later today?" For the temperature request, a number could fill any room previously left open, while the broader weather request could require the preparation of a sentence fragment that may include the need to analyze different arrangements of units to find the arrangement that results in the lowest cost as described above. Alternately, the third party skill could provide a completely synthesized final portion or the output response, in which case the back end system could simply send that portion directly to the electronic device. In any case, regardless of whether the utterance was generated and synthesized by the backend system, the third party skill, or a combination of the two, the processed audio output data is sent to the electronic device in step 426, and control goes to step 430.

Step 430 determines whether a complete response to the user's request has been generated. If a complete response has not been generated, the system returns to step 402 receive additional audio data representing additional portions of the user request. For example, in the example shown in FIGS. 3A-3C, the first pass through might result in the text being generated for the pre-waveforms arranged as shown in FIG. 3A, the second pass through might result in the text being generated for the pre-waveforms added in FIG. 3B, as well as the synthesis of the FIG. 3A pre-waveforms which would be transmitted to the electronic device in step 414. The third pass may result in the determination of the specific user request, and the arrangement of pre-waveforms shown at the end of FIG. 3C (i.e., pre-waveforms 316, 318, 320, 322, and 324), at which time the remaining waveforms (i.e., those from FIGS. 3B and 3C) could be synthesized separately or together at step 424 and sent to the electronic device in step 426.

Once it is determined that the response is complete at step 430, the process can stop at step 444 (because all of the portions of the output audio data have been sent to the electronic device). Alternately, the last portion of the process can be accomplished in other manners without departing from the spirit of the present embodiments. For example, once the overall structure of the response has been determined, metadata describing that structure could be sent to the electronic device. This metadata may, for example, could include the number of portions that the overall response will be provided, as well as the sequence of those portions. Under such circumstances, the electronic device could wait for receipt of all of the portions of the output response, and then play them as a single assemble output response.

Figure 5:
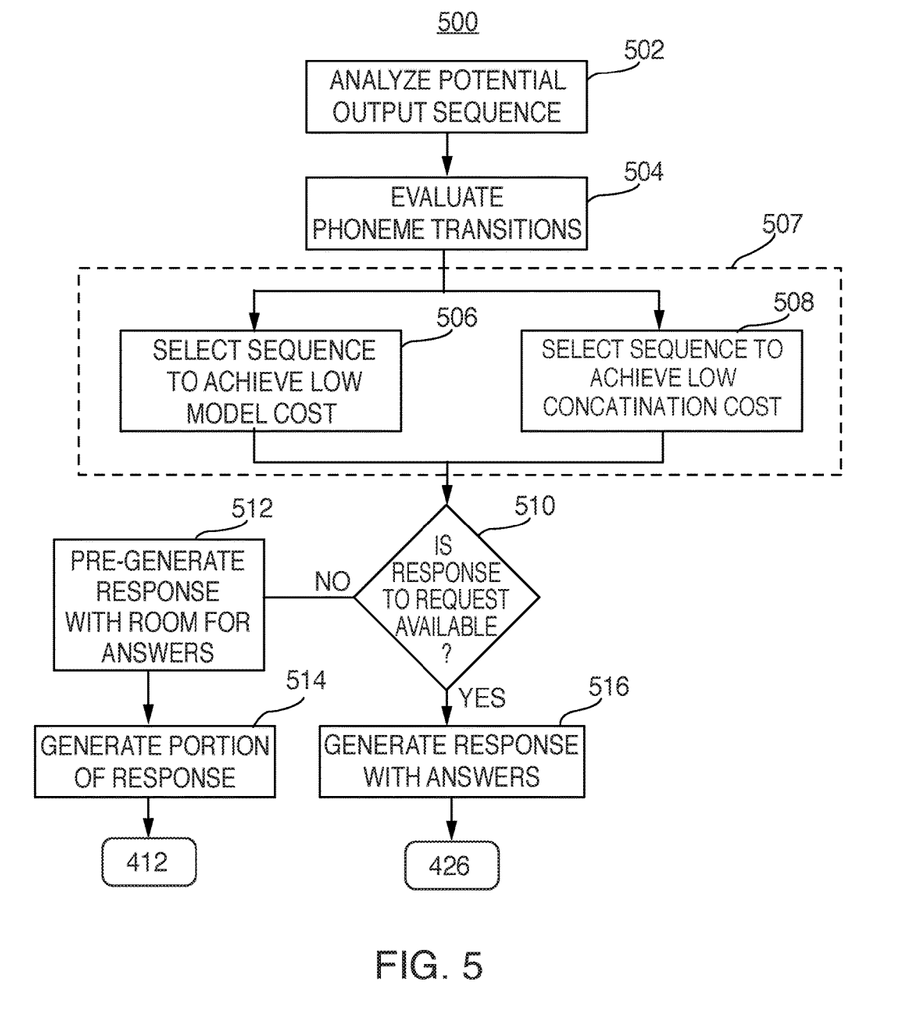
FIG. 5 is an illustrative flowchart of a process for determining a sequence of sentence elements that can be constructed into an output response in accordance with various embodiments.

FIG. 5 shows an illustrative flow chart of process 500, which may be a more detailed view of some of the processes that have been described above. In specific, process 500 illustrates at least some embodiments of the details of accomplishing steps 412 and 424 shown in FIG. 4. In particular, at step 502 the various different possible combinations of units are arranged as potential output sequences. This may, for example, include determining how many different ways to state what the weather is and arranging the units accordingly for further evaluation. At step 504, phoneme (or unit) transitions can be evaluated to establish the costs associated with each transition from one unit to the next. Steps 506 and 508, which are illustrated collectively by the dashed box as step 507, can occur in sequence (with either step occurring first), or they can occur in parallel as a way of rearranging the order of the phonemes to achieve a lower overall or combined cost (i.e., model cost and concatenation cost), or they can occur together as part of a single process. Once a sequence with an acceptable low cost has been determined, a check is made in step 510 to determine whether a response to the request is available. If the requested information is available, that portion of the output response is generated in step 516. If the requested information is not yet available, that portion can be pre-generated at step 512 by leaving room for the specific response (if appropriate), and control continues to step 514, where the response is generated.

Once two adjacent portions of the output response have been generated in accordance with the steps of FIGS. 4 and 5, the utterance graph for the portion occurring earlier in sequence can be synthesized to convert the generated text into audio output data that can be transmitted to the electronic device. The final portion of the audio output data can be synthesized once the requested information is obtained because the backend system can determine that that portion is the final portion, such that the final transition from speech unit to silence can be made (e.g., with a fade reducing the volume, etc.).

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific feature are disclosed as illustrative forms of implementing the claims.

What is claimed is:

1. A method comprising:
receiving, from an electronic device, audio input data representing a request;
performing speech recognition on the audio input data to obtain word data;
using natural language understanding (NLU) techniques on the word data to determine a topic associated with the request;
generating first audio output data including first words that are related to the topic;
determining that additional processing is needed to generate information responsive to the request;
generating second audio output data including second words that are related to the topic, the second words including transitional words between the first audio output data and the second audio output data, wherein the first audio output data and the second audio output data are generated at least partially in parallel;
prior to all of the audio input data being received from the electronic device, sending at least a portion of the first audio output data to the electronic device;
sending, at least partially in parallel to the first audio output data being sent, a communication to an interface associated with a skill to determine the information responsive to the request;
receiving, from the interface, the information responsive to the request;
generating third audio output data that includes the information responsive to the request and at least one additional transitional word between the second audio output data and the third audio output data,
wherein the third audio output data and the second audio output data are generated at least partially in parallel;
prior to all of the audio input data being received from the electronic device, sending at least a portion of the second audio output data to the electronic device, wherein sending the at least a portion of the second audio output data occurs at least partially in parallel with generating the third audio output data; and
sending the third audio output data to the electronic device.

2. The method of claim 1, wherein each of the first audio output data, the second audio output data, and the third audio output data are generated by evaluating a model cost associated with the first audio output data, the second audio output data, and the third audio output data, respectively, and by evaluating concatenation costs associated with transitions between the first words and the second words in the first audio output data and second audio output data, and the second words and third words in the second audio output data and the third audio output data.

3. A method, comprising:
receiving, from an electronic device, audio input data representing a first series of words associated with a request;
determining, using at least one natural language understanding (NLU) component, a topic to which the request relates;
generating first audio output data representing at least a first word, the at least first word being associated with the topic;
accessing an interface associated with a skill to determine information responsive to the request, the skill being associated with the topic,
wherein the accessing and generating of the first audio output data are performed at least partially in parallel;
prior to all of the audio input data being completely received, sending the first audio output data to the electronic device;
generating second audio output data that includes at least a second word based at least in part on the received information responsive to the request, wherein the second audio output data is generated at least partially in parallel with sending the first audio output data to the electronic device;

and sending the second audio output data to the electronic device.

4. The method of claim 3, further comprising:
generating third audio output data between the first audio output data and the second audio output data,
wherein the first audio output data is further based on a first transitional word between the first audio output data and the third audio output data, and the second audio output data is further based on a second transitional word between the third audio output data and the second audio output data, the first audio output data being sent to the electronic device prior to the second audio output data being generated.

5. The method of claim 4,
wherein third audio output data is sent to the electronic device before the information responsive to the request is determined.

6. The method of claim 3, wherein the first audio output data and the second audio output data are generated by evaluating a model cost and concatenation costs associated with a transition between the first audio output data and the second audio output data.

7. The method of claim 3, wherein generating the first audio output data comprises:
determining potential units of speech to be included in the first audio output data;
configuring different ordered combinations of the potential units of speech;
evaluating a plurality of concatenation costs associated with a plurality of transitions between different potential units of speech;
compiling a sum of the concatenation costs for the different ordered combinations; and
selecting an ordered combination having a lowest concatenation cost based on the sum such that the first audio output data is generated based on the potential units of speech in the ordered combination that is selected.

8. The method of claim 3, wherein generating the second audio output data further comprises:
generating the second audio output data after the information responsive to the request has been received.

9. The method of claim 3, further comprising:
determining, prior to sending the first audio output data, a model cost associated with a smoothness of the first audio output data.

10. The method of claim 3, further comprising:
sending the electronic device sequence information for playing the first audio output data prior to playing the second audio output data.

11. A system comprising: communications circuitry that receives, from an electronic device, audio input data representing a first series of words associated with a request; and
at least one processor operable to: use natural language understanding (NLU) techniques on word data to determine a topic associated with the request;
generate a first audio output data representing at least a first word, the first word being associated with the topic;
communicate with an interface associated with a skill to determine information responsive to the request, wherein the generation of the first audio output data is performed at least partially in parallel to the communication with the interface
prior to all portions of the audio input data being received from the electronic device, initiate, the communications circuitry to send the first audio output data to the electronic device;
generate, second audio output data, that includes at least a second word based at least in part on the received information responsive to the request, wherein the second audio output data is generated at least in partially in parallel with sending the first audio output data to the electronic device; and
initiate, the communications circuitry to send the second audio output data to the electronic device.

12. The system of claim 11, wherein generation of the first audio output data causes the at least one processor to be further operable to:
arrange potential units of speech in a plurality of different sequences;
evaluate a cost associated with a plurality of transitions from one potential unit to the next;
sum the costs associated with all transitions for a given different sequence;
and select a sequence from the plurality based at least in part on which sequence had a lowest sum.

13. The system of claim 11, wherein at least a majority of the first audio output data and the second audio output data are sent to the electronic device prior to all of the audio input data being received from the electronic device.

* * * * *